US010871403B1

(12) United States Patent
Simpson et al.

(10) Patent No.: US 10,871,403 B1
(45) Date of Patent: Dec. 22, 2020

(54) AIRCRAFT TEMPERATURE SENSOR

(71) Applicant: Kidde Technologies, Inc., Wilson, NC (US)

(72) Inventors: Terry Simpson, Wake Forest, NC (US); Stefan Coreth, Roanoke Rapids, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 0 days.

(21) Appl. No.: 16/579,155

(22) Filed: Sep. 23, 2019

(51) Int. Cl.
*G01K 7/22* (2006.01)
*G01K 7/40* (2006.01)
*G01K 7/06* (2006.01)

(52) U.S. Cl.
CPC ............. *G01K 7/223* (2013.01); *G01K 7/06* (2013.01); *G01K 7/40* (2013.01)

(58) Field of Classification Search
CPC ....... G01K 7/223; G01K 7/40; G01M 11/086; G08B 17/06
See application file for complete search history.

(56) References Cited

U.S. PATENT DOCUMENTS

| 4,654,520 A * | 3/1987 | Griffiths | G01B 11/18 250/227.14 |
| 4,668,857 A * | 5/1987 | Smuckler | H01C 7/027 219/549 |
| 5,051,590 A | 9/1991 | Kern et al. | |
| 5,051,595 A | 9/1991 | Kern et al. | |
| 5,064,271 A | 11/1991 | Kern et al. | |
| 5,306,088 A | 4/1994 | Zoerner | |
| 5,841,617 A * | 11/1998 | Watkins, Jr. | H02H 5/043 361/106 |
| 6,109,783 A | 8/2000 | Dobler et al. | |
| 6,559,437 B1 * | 5/2003 | Pope, Jr. | G01M 11/086 250/227.14 |
| 6,881,948 B2 | 4/2005 | Dammann | |

(Continued)

FOREIGN PATENT DOCUMENTS

| BR | 102014006083 A2 | 12/2014 |
| EP | 1455320 A1 | 9/2004 |

(Continued)

OTHER PUBLICATIONS

Extended European Search Report; Application No. 19212854.4; dated Jul. 2, 2020; 54 pages.

*Primary Examiner* — Kyung S Lee
(74) *Attorney, Agent, or Firm* — Cantor Colburn LLP

(57) ABSTRACT

Disclosed is a sensor for detecting temperature of an aircraft. The sensor comprises a temperature sensor elongated with respect to an axis. The temperature sensor comprises a sheath elongated with respect to the axis. The temperature sensor comprises a central conductor disposed within the sheath and elongated with respect to the axis having a conductor material defining a conductor temperature coefficient having a conductor coefficient magnitude. The temperature sensor comprises an optical fiber disposed within the sheath. The temperature sensor comprises a thermistor disposed within the sheath and surrounding the central conductor, the thermistor having thermistor material defining a thermistor temperature coefficient defining a thermistor coefficient magnitude greater than the conductor coefficient magnitude.

20 Claims, 5 Drawing Sheets

(56) References Cited

U.S. PATENT DOCUMENTS

| | | | |
|---|---|---|---|
| 6,960,019 B2 | 11/2005 | Dammann | |
| 7,098,797 B2 | 8/2006 | Chahrour et al. | |
| 8,248,260 B1 * | 8/2012 | Pope | H02H 5/10 |
| | | | 340/657 |
| 8,306,373 B2 | 11/2012 | Xia et al. | |
| 9,443,408 B2 | 9/2016 | Rennie et al. | |
| 9,787,083 B2 * | 10/2017 | Lam | H01R 13/7137 |
| 10,002,508 B2 | 6/2018 | Rogers | |
| 10,112,726 B2 | 10/2018 | Wilson et al. | |
| 10,151,643 B2 | 12/2018 | Gilbert | |
| 10,658,833 B2 * | 5/2020 | Galin | H02J 3/38 |
| 2003/0184310 A1 * | 10/2003 | Lurtz | G01K 7/223 |
| | | | 324/525 |

FOREIGN PATENT DOCUMENTS

| | | |
|---|---|---|
| EP | 3246683 A1 | 11/2017 |
| GB | 2276944 A | 10/1994 |
| WO | 199318494 A1 | 9/1993 |

* cited by examiner

AIRCRAFT TEMPERATURE SENSOR

BACKGROUND

The present disclosure relates to the art of aircraft temperature detection systems. Aircraft temperature detection systems comprise sensors and sensory devices to determine overheat situations and other temperature anomalies.

Temperature detection systems may be configured to cooperate with controllers and other electronic or logical devices that provide annunciation or indication to operators.

BRIEF DESCRIPTION

Disclosed is a sensor for detecting temperature of an aircraft. The sensor comprises a temperature sensor elongated with respect to an axis. The temperature sensor comprises a sheath elongated with respect to the axis. The temperature sensor comprises a central conductor disposed within the sheath and elongated with respect to the axis having a conductor material defining a conductor temperature coefficient having a conductor coefficient magnitude. The temperature sensor comprises an optical fiber disposed within the sheath. The temperature sensor comprises a thermistor disposed within the sheath and surrounding the central conductor, the thermistor having thermistor material defining a thermistor temperature coefficient defining a thermistor coefficient magnitude greater than the conductor coefficient magnitude.

In addition to one or more of the features described above, or as an alternative, further embodiments may include that the optical fiber forms a helix with respect to the axis.

In addition to one or more of the features described above, or as an alternative, further embodiments may include that the helix defines a tangent vector having a constant angle respective the axis.

In addition to one or more of the features described above, or as an alternative, further embodiments may include that the thermistor defines a trough sized to retain the optical fiber formed to coincide with the helix.

In addition to one or more of the features described above, or as an alternative, further embodiments may include that the trough is sized to retain the optical fiber and to have contact with the optical fiber at only two contact points.

In addition to one or more of the features described above, or as an alternative, further embodiments may include that the optical fiber is disposed in an atmosphere of noble gas and the atmosphere of noble gas is retained by the trough and the sheath.

Also disclosed is a sensor for detecting temperature of an aircraft. The sensor comprises a temperature sensor elongated with respect to an axis and having a cross-section respective the axis. The cross-section comprises a sheath. The cross-section comprises a central conductor disposed within the sheath having a conductor material defining a conductor temperature coefficient having a conductor coefficient magnitude. The cross-section comprises an optical fiber disposed within the sheath. The cross-section comprises a thermistor disposed within the sheath and surrounding the central conductor, the thermistor having thermistor material defining a thermistor temperature coefficient defining a thermistor coefficient magnitude greater than the conductor coefficient magnitude.

In addition to one or more of the features described above, or as an alternative, further embodiments may include that the thermistor defines a trough sized to retain the optical fiber, and the optical fiber is disposed within the trough.

In addition to one or more of the features described above, or as an alternative, further embodiments may include that the trough is defined to extend parallel to the axis forming a helix about the axis and the optical fiber traverses the axis within the trough.

In addition to one or more of the features described above, or as an alternative, further embodiments may include that the helix defines a tangent vector having a constant angle with respect to the axis.

In addition to one or more of the features described above, or as an alternative, further embodiments may include that the trough is sized to retain the optical fiber and contact the optical fiber at only two contact points.

In addition to one or more of the features described above, or as an alternative, further embodiments may include that the optical fiber is disposed in an atmosphere of noble gas and the atmosphere of noble gas is retained by the trough and the sheath.

In addition to one or more of the features described above, or as an alternative, further embodiments may include that the central conductor defines a tube sized to retain the optical fiber, and the optical fiber is disposed within the tube.

In addition to one or more of the features described above, or as an alternative, further embodiments may include that the tube sized to retain the optical fiber circumscribes the optical fiber.

In addition to one or more of the features described above, or as an alternative, further embodiments may include that the optical fiber is disposed in an atmosphere of noble gas retained by the tube.

In addition to one or more of the features described above, or as an alternative, further embodiments may include that the sheath is filled by the thermistor and the optical fiber is encapsulated by the thermistor and the sheath.

In addition to one or more of the features described above, or as an alternative, further embodiments may include that the central conductor and the thermistor form the sensor with the sheath and the sheath defines a ground.

Also disclosed is a method of manufacturing a sensor. The method comprises combining a central conductor with a thermistor by extruding the thermistor with the central conductor through a die. The method comprises combining an optical fiber with the central conductor and the thermistor. The method comprises sheathing the optical fiber, the thermistor, and the central conductor to form the sensor.

In addition to one or more of the features described above, or as an alternative, further embodiments may include that the die comprises a key configured to define a trough in the thermistor and combining the optical fiber with the central conductor and the thermistor comprises inserting the optical fiber in the trough.

In addition to one or more of the features described above, or as an alternative, further embodiments may include rotating the die during the combining of the central conductor and the thermistor such that the trough forms a helix with respect to an axis of the sensor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
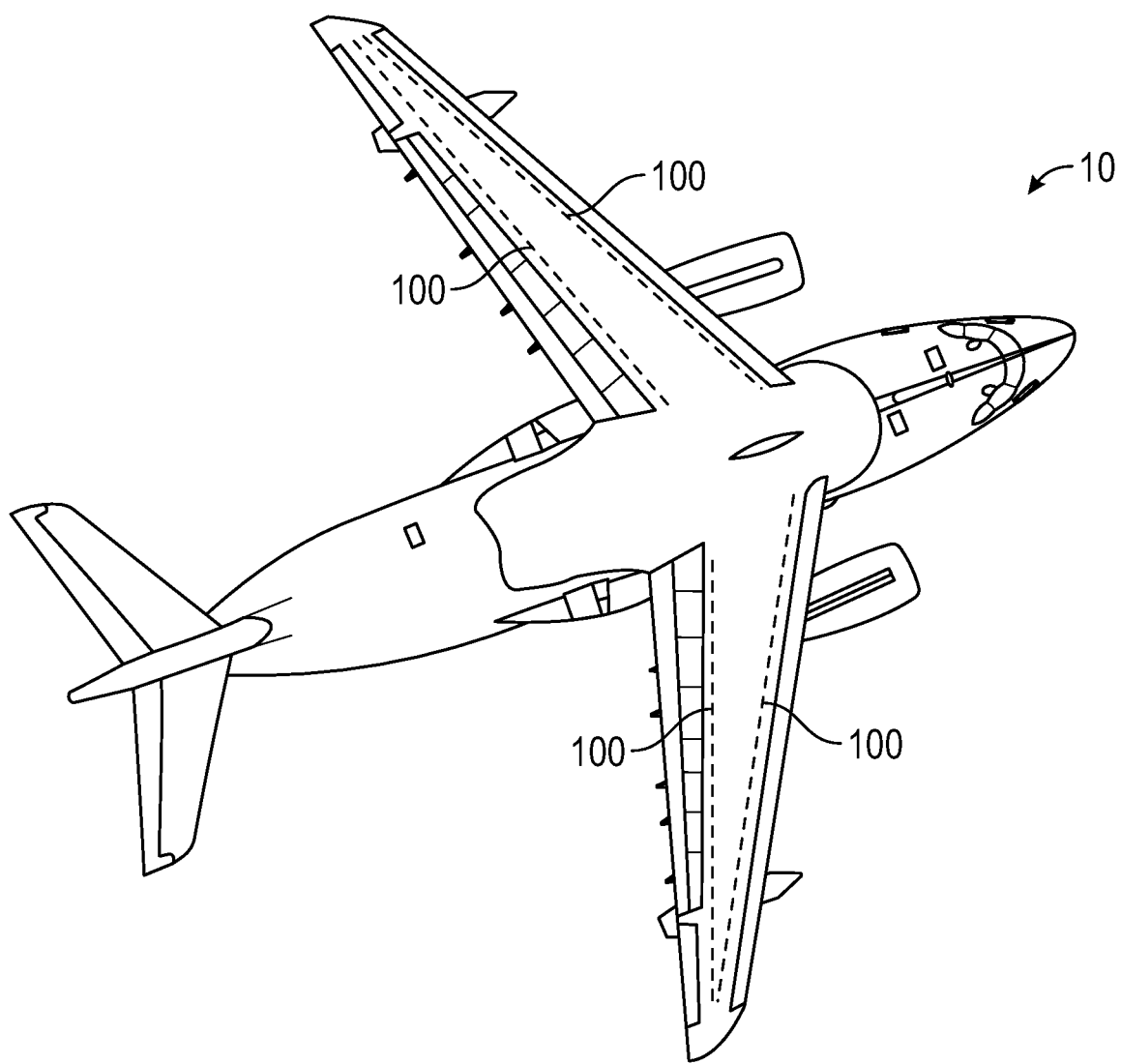
FIG. 1 illustrates an example an aircraft having a temperature sensor.

Referring to FIG. 1 an aircraft 10 is shown. The aircraft 10 may comprise temperature sensors 100. As an example, the temperature sensors 100 may be disposed throughout the aircraft 10. The temperature sensors 100 may be disposed on wings of the aircraft 10.

Figure 2A:
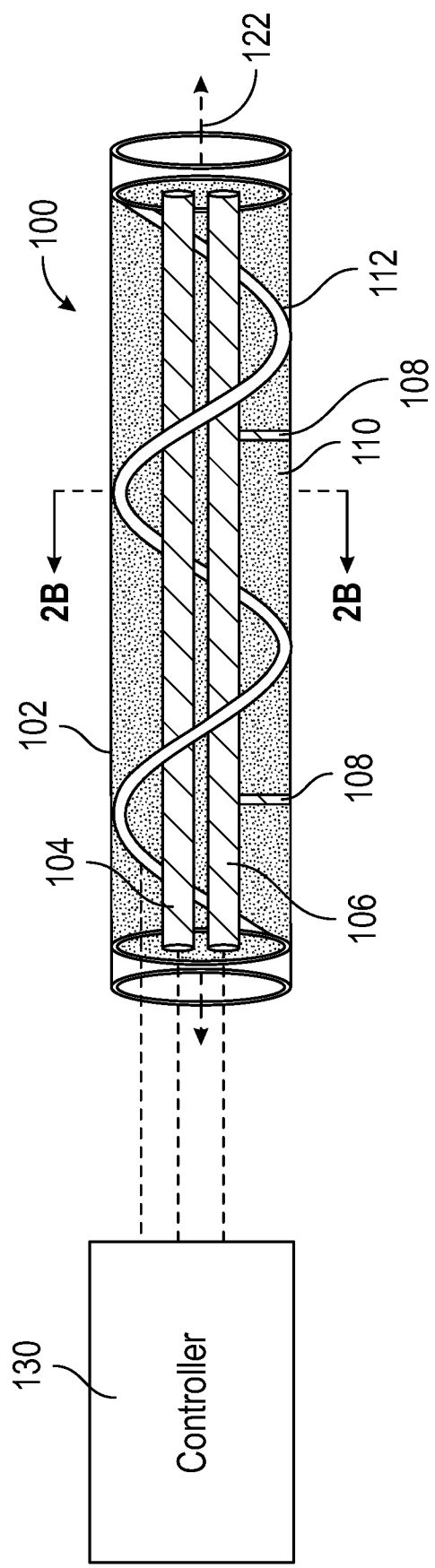
FIG. 2A illustrates an example of one implementation of the teachings in this disclosure on a temperature sensor of an aircraft.
Figure 2B:
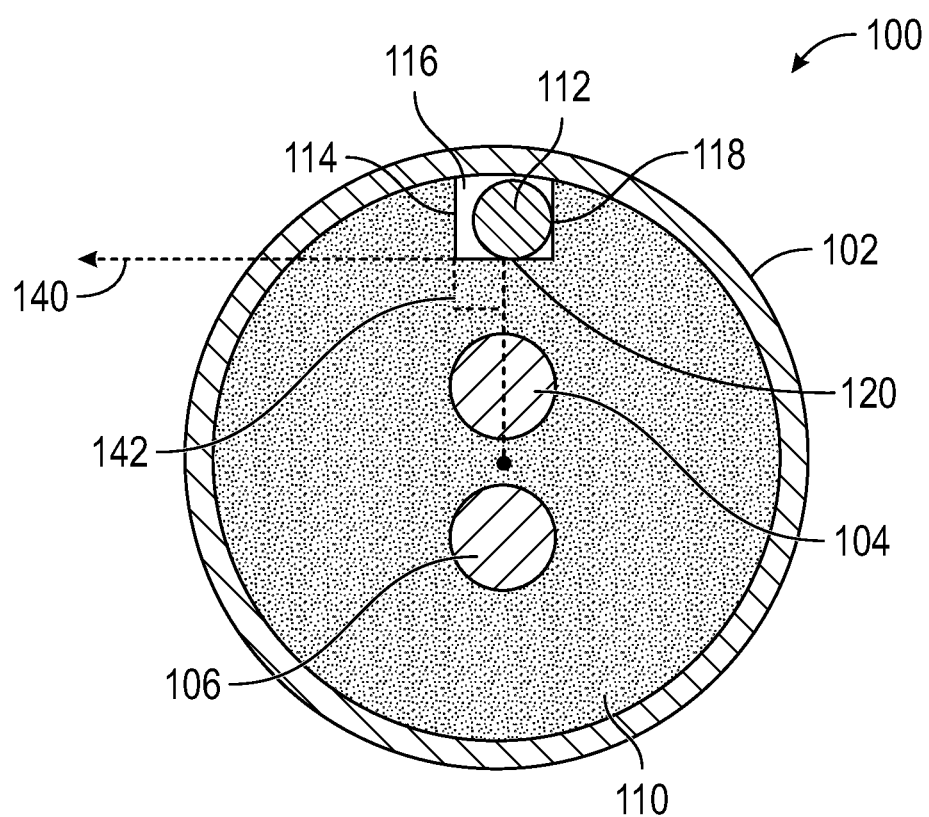
FIG. 2B illustrates a cross-section of the temperature sensor of FIG. 2A.

Referring to FIGS. 2A-2B, a temperature sensor 100 according to one or more implementations of the present disclosure is shown. The temperature sensor 100 comprises sheath 102. The sheath 102 may be made of any material. The sheath 102 may comprise Inconel. The sheath 102 may be made of a metal or a metal alloy that provide flame or heat protection. The sheath 102 may be elongated with respect to axis 122. The sheath 102 may serve as an electrical ground path. The axis 122 may define a particular portion or portions of the sensor 100. The sensor 100 may be elongated to cover an entire aircraft 10, aircraft wings, or portions thereof. Non-limiting, specific examples comprise engine nacelles, auxiliary power unit bays, and landing gear bays.

As illustrated, the sheath 102 houses a central conductor 104. The central conductor 104 is along axis 122 in FIG. 2. The central conductor 104 may be solid, stranded, tubed, or any other implement. The central conductor 104 may be located at any radial position with respect to the axis 122. The axis 122 may pass through the center of the sheath 102 or the central conductor 104. The axis 122 may be offset from the center of the sheath 102 or the central conductor 104. The central conductor 104 may be made of any conductive material (e.g., copper). The conductive material defines a conductor temperature coefficient. The conductor temperature coefficient defines a relative change of a resistance or conductance as temperature changes. The conductor temperature coefficient may be positive or negative. As shown in Equation 1, the temperature coefficient k corresponds to relative changes in resistance, R, and temperature, t.

$$\Delta R = k \Delta T \quad (1)$$

It should be appreciated that the simple example of Equation 1 does not require the conductor temperature coefficient k to be linear. The temperature coefficient k may correspond to rates based on minimal steps at specific temperature differences determined by numerical methods or other non-linear principles.

The conductor temperature coefficient k may comprise a sign (e.g., positive or negative) and a conductor coefficient magnitude. The conductor coefficient magnitude may be defined numerically or in other ways.

The sensor 100 also comprises a ground conductor 106. The ground conductor 106 may be made of the same or various materials than the central conductor 104. The ground conductor 106 may be connected with the sheath 102 and external ground points through grounding legs 108. The grounding legs 108 may have the same material properties as the ground conductor 106 or the central conductor 104. It should be appreciated that the ground conductor 106 may be omitted and substituted for a direct connection with the sheath 102.

A thermistor 110 is be disposed within the sheath 102. The thermistor 110 may be composed of any type of temperature-dependent resistive material or combination thereof. The thermistor 110 may fill the sheath 102. The thermistor 110 may loosely fit the sheath 102 such that atmosphere 116 fills, naturally or through disposition, between the thermistor 110 and the sheath 102. The atmosphere 116 may be an inert or noble gas. The thermistor 110 may be extruded through a die 304 (as shown in one of many examples in FIG. 4) and shrink wrapped or similarly extruded with the sheath 102. The thermistor 110 may surround, circumscribe, join, or encapsulate the central conductor 104, or any combination thereof.

An optical fiber 112 is to be disposed within the sheath 102. Those versed in the art will readily appreciate that the optical fiber may be comprise other components or combinations. As a non-limiting example, the optical fiber 112 may be a fiber optic cable. The optical fiber 112 may comprise a jacket material. The optical fiber may be silica based with disposed coatings. The optical fiber 112 may be disposed to translate across, among, along, or about the axis 122. The optical fiber 112 may be formed in a helix with respect to the axis 122. The optical fiber 112 has a tangent 140 with respect to the axis 122 that may have a constant angle 142. The optical fiber 112 may comprise fiber Bragg gratings (FBG) configured to provide changes in light transmission or reflection along the optical fiber 112 that correspond with changes in temperature. As such, the changes allow a controller 130 or another implement to sense temperature changes at particular locations along the sensor 100. The optical fiber 112 may be situated without encumbrance or strain to ensure proper reading from the FBG. The thermistor 110 defines a trough 114 to guide the optical fiber 112. The trough 114 may be sized to touch the optical fiber 112 without encumbrance. That is, the trough 114 may be sized to have not more than two contact points 118, 120 with the optical fiber 112. As such, the optical fiber 112 is unencumbered by surroundings, increasing the measurement accuracy provided by the FBG.

The sensor 100 encloses two sensing loops. One sensing loop is formed by the optical fiber 112, and the other sensing loop is formed by the central conductor 104, the thermistor 110, and a ground, which may be either the ground conductor 106 or the sheath 102. The controller 130 receives these inputs, as shown, and operates or informs operators of the aircraft 10 as such. As an example, if the controller 130 determines that temperatures associated with the sensor 100 are greater than a predetermined threshold, the controller 130 alerts an operator of the condition. The sensor 100 may be configured to indicate the location of the temperature fluctuation based on the FBGs or other implementations along the sensor 100. Automatic implementations may comprise temperature reduction measures or other aircraft operations.

The controller 130 may comprise two thresholds. A low temperature threshold (~500° C.) and a high temperature threshold (~800° C.). The high temperature threshold may allow the controller 130 or operators to actuate halon systems in the aircraft 10. The optical fiber 112 may provide the lower temperature threshold and continuous temperature monitoring. The central conductor 104, thermistor 110, and sheath 102 may cover both thresholds. Those versed in the art will readily appreciate that different combinations may be used to satisfy the thresholds. In some circumstances, the thermistor 110 may create a tradeoff between low and high temperature thresholds and their associated response times to temperature changes. The addition of the optical fiber 112 can offset this trade off. The optical fiber 112 is able to detect lower thresholds and continuously monitor temperature. High temperature material limitations of the optical fiber 112 and FBGs the optical fiber 112 may not survive the high temperature events and may be sacrificial during such events.

Figure 3A:
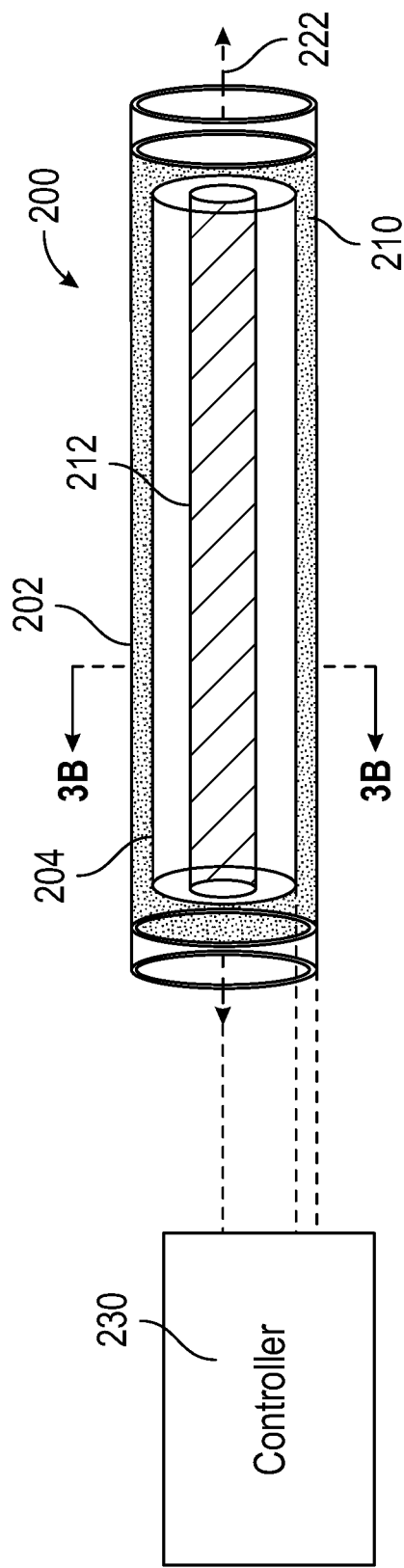
FIG. 3A illustrates an example of another implementation of the teachings in this disclosure on a temperature sensor of an aircraft.
Figure 3B:
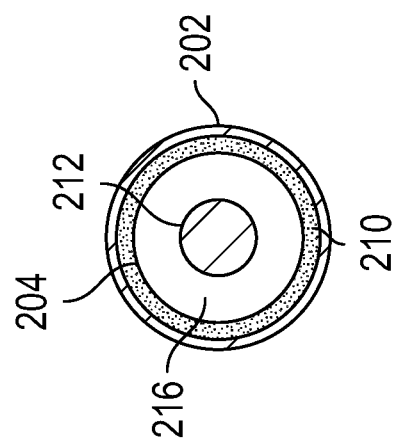
FIG. 3B illustrates a cross-section of the temperature sensor of FIG. 3A.

Referring to FIGS. 3A-3B, a sensor 200 is shown in accordance with one or more implementations of the current disclosure. The sensor 200 comprises a sheath 202. The sheath 202 is elongated along the axis 222. The sheath 202 houses a central conductor 204. The central conductor 204 may be a tube or hollow cylinder. The central conductor 204 may be associated with the thermistor 210. The central conductor 204 may be disposed within the sheath 202 and surrounded, circumscribed, joined, encapsulated or any combination thereof by the thermistor 210. The central conductor 204 may be aligned with the axis 222 and elongated along the axis 222. The central conductor 204 may be offset from the axis 222. The central conductor 204 may house an optical fiber 212. The optical fiber 212 may be elongated with respect to the axis 222. The optical fiber 212 may be disposed in an atmosphere 216 of inert or noble gas. The atmosphere 216 may be naturally or intentionally disposed.

The sensor 200 encloses two sensing loops. One sensing loop is formed by the optical fiber 212, which may be single-ended operating according to refraction or reflection, and the other sensing loop is formed by the central conductor 204, the thermistor 210, and a ground, which may be the sheath 102. The controller 130 receives these inputs, as shown, and operates or informs operators of the aircraft 10 as such.

The sensors 100, 200 may terminate at the controllers 130, 230 respectively. The controllers 130, 230 may comprise any combination of processors, field programmable gate arrays (FPGA), or application specific integrated circuits (ASIC). The controllers 130, 230 may comprise memory, volatile and non-volatile, operable to store machine instructions from the processors and other processing mechanisms to receive, calculate, and control devices, as necessary. Machine instructions may be stored (e.g., stored instructions, stored machine instructions, stored steps) in any language or representation, comprising but not limited to machine code, assembly instructions, C, C++, C #, PASCAL, COBAL, PYTHON, JAVA, and RUBY. It should be appreciated that any type of wired or wireless configuration is appreciated for any of the communications from the controllers 130, 230. Wireless protocols such as ZIGBEE, WI-FI, BLUETOOTH, or any other implement may be used. Communications may be realized through any protocol or medium known or unknown.

Figure 4:
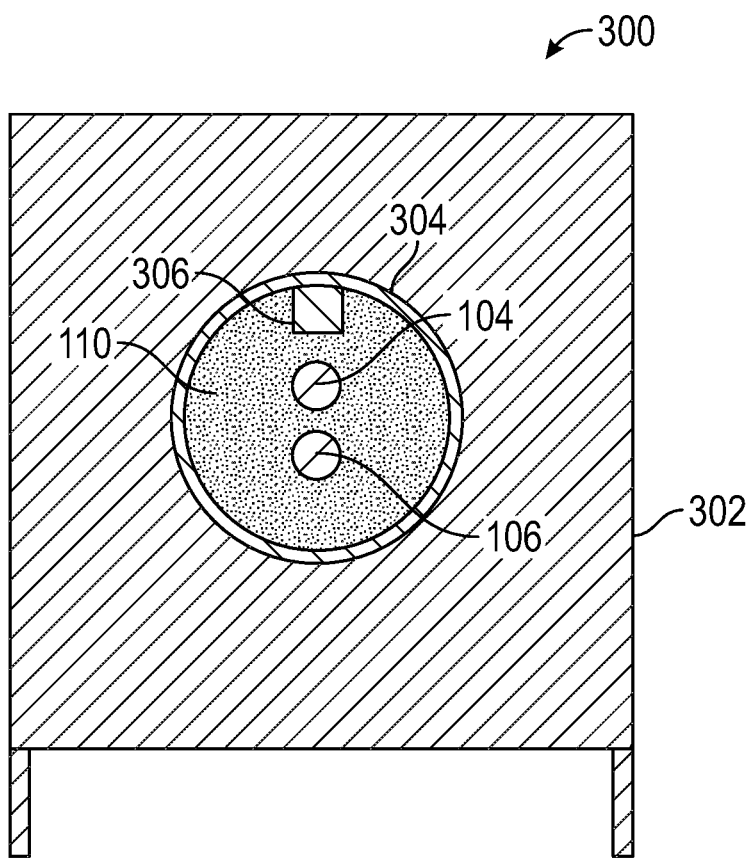
FIG. 4 illustrates an extrusion machine having a die.

Referring to FIG. 4, an extrusion machine 300 is shown. The extrusion machine 300 comprises a body 302. The extrusion machine 300 further comprises a die 304 having a key 306. The die 304 may be rotated or oriented to adjust an angle of the key 306 with respect to an elongate axis of the thermistor 110, 210. The key 306 may be configured to generate the trough 114.

Figure 5:
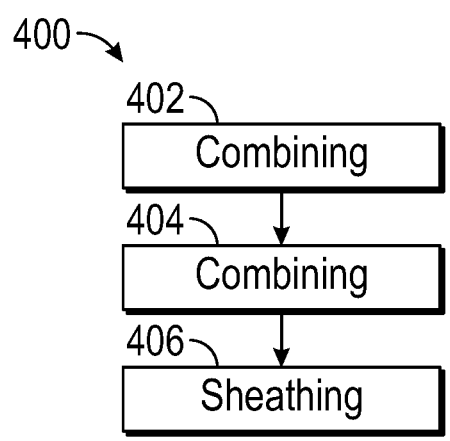
FIG. 5 illustrates a method of manufacturing a temperature sensor of an aircraft.

Referring to FIG. 5, a method 400 is shown in accordance with one or more implementations of the present disclosure. The method 400 illustrates a step-by-step process for manufacturing a sensor 100, 200 in accordance with one or more embodiments of the present invention. It should be appreciated that any of the steps or blocks shown in FIG. 5 may be rearranged, omitted, or repeated. Further, the steps may be performed in parallel or in sequence.

The method 400 comprises combining a central conductor 104, 204 with a thermistor 110, 210 by extruding the thermistor 110, 210 with the central conductor 104, 204 through a die 304 in step 402. The central conductor 104, 204 may be fed into the extrusion machine 300 during extrusion of the thermistor 110, 210.

The method 400 may comprise rotating the die 304 while combining the central conductor 104, 204 with the thermistor 110, 210 to a create the trough 114 with the helix form as shown, as one of many examples, in FIG. 2A.

The method 400 comprises combining an optical fiber 112, 212 with the central conductor 104, 204 and the thermistor 110, 210. Combining the optical fiber 112, 212 may be by man or machine. The optical fiber 112, 212 may be combined during extrusion of the central conductor 104, 204 and the thermistor 110, 210. The optical fiber 112 may be inserted into the trough 114. The method 400 comprises sheathing the optical fiber 112, 212, the thermistor 110, 210, and the central conductor 104, 204 to form the sensor 100, 200. Sheathing may comprise lamination or heat shrinking the sheath 102, 202 to the extruded thermistor 110, 210. Space between the thermistor 110, 210 and the sheath 102, 202 may be left to allow atmosphere 116, 216 to form between the thermistor 110, 210 and the sheath 102, 202. The method 400 may comprise injected atmosphere 116, 216 within the sheath 102, 202 during manufacture and sealing the sensor 100, 200 when manufacture is complete.

It should be appreciated that any type of connecting apparatus between the sensor 100, 200 and the controllers 130, 230 may be used. As an example, MIL-DTL-38999 series connections may be implemented. The optical fiber 112, 212 may be epoxied to the center of a pin of the connector and the endface may be polished. A ceramic ferrule or pin may be used. An electrical connector may be added to the connecter to provide electrical connections between the sensors 100, 200 and the controllers 130, 230. The electrical connector or connectors may be coaxial with the fiber optic pin. A threaded collar may be used to mate an outer sleeve of the connector to the sheath 102, 202.

The terminology used herein is for the purpose of describing the features associated with the present disclosure and is not intended to be limiting of the present disclosure. As used herein, the singular forms "a", "an" and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to features and parts, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to any particular features or parts disclosed as the best mode contemplated for carrying out this present disclosure, but that the present disclosure will comprise all that falls within the scope of the claims.

What is claimed is:

1. A sensor for detecting temperature of an aircraft, the sensor comprising:
a temperature sensor elongated with respect to an axis comprising:
a sheath elongated with respect to the axis;
a central conductor disposed within the sheath and elongated with respect to the axis having a conductor material defining a conductor temperature coefficient having a conductor coefficient magnitude;
an optical fiber disposed within the sheath; and
a thermistor disposed within the sheath and surrounding the central conductor, the thermistor having thermistor material defining a thermistor temperature coefficient defining a thermistor coefficient magnitude greater than the conductor coefficient magnitude.

2. The sensor of claim 1, wherein the optical fiber forms a helix with respect to the axis.

3. The sensor of claim 2, wherein the helix defines a tangent vector having a constant angle respective the axis.

4. The sensor of claim 2, wherein the thermistor defines a trough sized to retain the optical fiber formed to coincide with the helix.

5. The sensor of claim 4, wherein the trough is sized to retain the optical fiber and to have contact with the optical fiber at only two contact points.

6. The sensor of claim 4, wherein the optical fiber is disposed in an atmosphere of noble gas and the atmosphere of noble gas is retained by the trough and the sheath.

7. A sensor for detecting temperature of an aircraft, the sensor comprising:
a temperature sensor elongated with respect to an axis and having a cross-section respective the axis, the cross-section comprising:
a sheath;
a central conductor disposed within the sheath having a conductor material defining a conductor temperature coefficient having a conductor coefficient magnitude;
an optical fiber disposed within the sheath; and
a thermistor disposed within the sheath and surrounding the central conductor, the thermistor having thermistor material defining a thermistor temperature coefficient defining a thermistor coefficient magnitude greater than the conductor coefficient magnitude.

8. The sensor of claim 7, wherein the thermistor defines a trough sized to retain the optical fiber, and the optical fiber is disposed within the trough.

9. The sensor of claim 8, wherein the trough is defined to extend parallel to the axis forming a helix about the axis and the optical fiber traverses the axis within the trough.

10. The sensor of claim 9, wherein the helix defines a tangent vector having a constant angle with respect to the axis.

11. The sensor of claim 8, wherein the trough is sized to retain the optical fiber and contact the optical fiber at only two contact points.

12. The sensor of claim 8, wherein the optical fiber is disposed in an atmosphere of noble gas and the atmosphere of noble gas is retained by the trough and the sheath.

13. The sensor of claim 7, wherein the central conductor defines a tube sized to retain the optical fiber, and the optical fiber is disposed within the tube.

14. The sensor of claim 13, wherein the tube sized to retain the optical fiber circumscribes the optical fiber.

15. The sensor of claim 13, wherein the optical fiber is disposed in an atmosphere of noble gas retained by the tube.

16. The sensor of claim 7, wherein the sheath is filled by the thermistor and the optical fiber is encapsulated by the thermistor and the sheath.

17. The sensor of claim 7, wherein the central conductor and the thermistor form the sensor with the sheath and the sheath defines a ground.

18. A method of manufacturing a sensor comprising:
combining a central conductor with a thermistor by extruding the thermistor with the central conductor through a die;
combining an optical fiber with the central conductor and the thermistor; and
sheathing the optical fiber, the thermistor, and the central conductor to form the sensor.

19. The method of claim 18, wherein the die comprises a key configured to define a trough in the thermistor and combining the optical fiber with the central conductor and the thermistor comprises inserting the optical fiber in the trough.

20. The method of claim 19, further comprising rotating the die during the combining of the central conductor and the thermistor such that the trough forms a helix with respect to an axis of the sensor.

* * * * *